3,381,001
SYNTHETIC PENICILLINS
Donald Neil McGregor, Fayetteville, N.Y., assignor to Bristol-Myers Company, a corporation of Delaware
No Drawing. Filed Aug. 25, 1967, Ser. No. 663,206
12 Claims. (Cl. 260—239.1)

ABSTRACT OF THE DISCLOSURE

6 - ($\alpha$ - sulfoaminophenylacetamido)- and 6-($\alpha$-sulfoaminothienylacetamido)-penicillanic acids are valuable as antibacterial agents, nutritional supplements in animal feeds, therapeutic agents in poultry and animals, including man, and are especially useful in the treatment of infectious diseases caused by Gram-positive and Gram-negative bacteria, most particularly those caused by the Pseudomonas genus. 6 - (D - $\alpha$-sulfoaminophenylacetamido)-penicillanic acid, a preferred embodiment of the invention, is prepared by the treatment of 6-(D-$\alpha$-aminophenylacetamido)-penicillanic acid with trimethylamine-sulfur trioxide complex.

Background of the invention (1) Field of the invention.—The penicillins of the present invention are compounds particularly useful in the treatment of Pseudomonas infections.

(2) Description of the prior art.—The compounds of the present invention are new and novel. Heretofore very few penicillins were found to possess any significant activity against Pseudomonas. The compounds of the present invention are unique in possessing this desirable activity.

Summary of the invention

Compounds having the formula

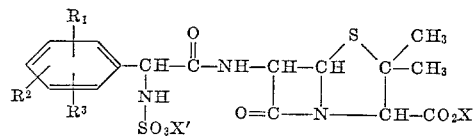

IA or

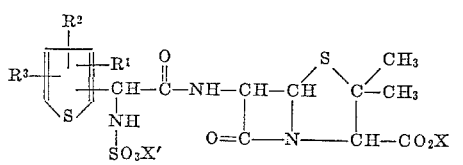

IB wherein $R^1$, $R^2$ and $R^3$ each represents a member selected from the group consisting of hydrogen, nitro, di(lower) alkylamino, (lower)-alkanoylamino, (lower)alkanoyloxy, (lower)alkyl (including straight and branched chain saturated aliphatic groups having from 1 to 6 carbon atoms inclusive), (lower)alkoxy, sulfamyl, chloro, iodo, bromo, fluoro and trifluoromethyl;

X and X' are alike or different and each is hydrogen, nontoxic metallic cations such as sodium, potassium, calcium, aluminum, and the like, the ammonium cation and substituted ammonium cations, e.g., cations of such nontoxic amines as tri(lower)alkylamines, i.e., triethylamine, etc., procaine, dibenzylamine, N-benzyl-beta-phenethylamine, 1-ephenamine, N,N'-dibenzylethylenediamine, dehydroabietylamine, N.N'-bis-dehydroabietylethylenediamine, N-(lower)alkylpiperidine, e.g., N-ethylpiperidine, or other such amines which have been used to form pharmaceutically acceptable nontoxic salts with benzylpenicillin, are prepared by the treatment of the corresponding alpha-amino compound with a sulfur trioxide complex such as triethylamine-sulfur trioxide.

Detailed description

This invention relates to new synthetic compounds of value as antibacterial agents, as nutritional supplements in animal feeds, as agents for the treatment of mastitis in cattle and as therapeutic agents in poultry and animals, including man, in the treatment especially of infectious diseases caused by Gram-positive and Gram-negative bacteria and more particularly, relates to 6-($\alpha$-sulfoaminophenylacetamido)-penicillanic acids, 6-($\alpha$-sulfoaminothienylacetamido)-penicillanic acids, and the pharmaceutically acceptable salts thereof.

Antibacterial agents such as ampicillin (U.S. 2,985,648) have proved highly effective in the past in the therapy of infections due to Gram-positive and Gram negative bacteria but these compounds have been notably lacking in their ability to effectively control Pseudomonas infections.

It was an object of the present invention to provide compounds useful in the treatment of infections caused by Gram-positive and Gram-negative bacteria, including particularly those caused by Pseudomonas aeruginosa.

The compounds of the present invention are particularly useful in that they possess antibacterial activity against both Gram-positive and Gram-negative bacteria, and most particularly exhibit activity against Pseudomonas aeruginosa infections.

The objects of the present invention have been achieved by the provision of a member selected from the group of compounds having the formula

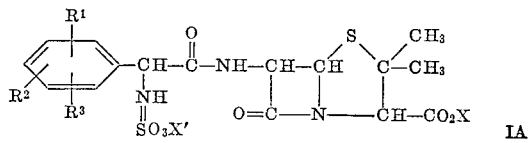

IA or

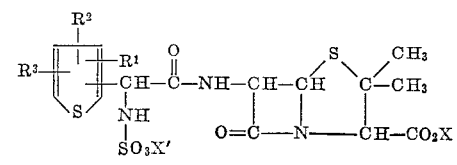

IB wherein $R^1$, $R^2$ and $R^3$ each represents a member selected from the group consisting of hydrogen, nitro, di (lower)alkylamino, (lower)alkanoylamino, (lower)alkanoyloxy, (lower)alkyl (including straight and branched chain saturated aliphatic groups having from 1 to 6 carbon atoms inclusive and preferably methyl, ethyl, n-propyl), (lower)alkoxy, (preferably methoxy and ethoxy) sulfamyl, chloro, iodo, bromo, fluoro and trifluoromethyl;

X and X' are alike or different and each is hydrogen, nontoxic metallic cations such as sodium, potassium, calcium, aluminum, and the like, the ammonium cation and substituted ammonium cations, e.g., cations of such nontoxic amines as tri(lower)alkylamines, i.e., triethylamine, etc., procaine, dibenzylamine, N-benzyl-beta-phenethylamine, 1-ephenamine, N,N'-dibenzylethylenediamine, dehydroabietylamine, N,N'-bis-dehydroabietylethylenediamine, N-(lower)alkylpiperidine, e.g., N-ethylpiperdine, or other such amines which have been used to form pharmaceutically acceptable nontoxic salts with benzylpenicillin.

The $\alpha$-carbon atom of the acyl group (to which the $\alpha$-amino group is attached) is an asymmetric carbon atom and the compounds of this invention can therefore exist in two optically active isomeric forms [the D- and L-diasteroisomers], as well as in the DL form which is a mixture of the two optically active forms; all such isomeric forms of the compounds are included within the scope of the present invention. Also included within the scope of the present invention are easily hydrolyzed esters which are converted to the free acid form by chemical or enzymatic hydrolysis.

The compounds of the present invention are prepared by the process comprising the consecutive steps of (a) Mixing a compound having the formula

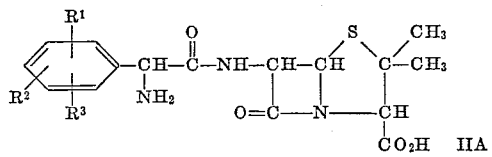

or

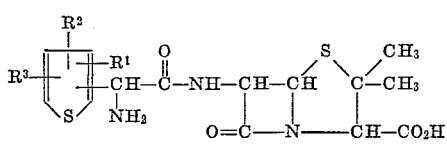

or a mono- or polyhydrate or salt thereof, wherein $R^1$, $R^2$ and $R^3$ each represents a member selected from the group consisting of hydrogen nitro, di(lower)-alkylamino, (lower)alkanoylamino, (lower)alkanoyloxy, (lower)alkyl (including straight and branched chain saturated aliphatic groups having from 1 to 6 carbon atoms inclusive), (lower)alkoxy, sulfamyl, chloro, iodo, bromo, fluoro and trifluoromethyl;

with a sulfur trioxide complex such as pyridine-sulfur trioxide, dioxane-sulfur trioxide, dimethylaniline-sulfur trioxide, thioxane-sulfur trioxide, bis-2-chloroethylether-sulfur trioxide, 2-methylpyridine-sulfur trioxide, dimethylformamide-sulfur trioxide, quinoline-sulfur trioxide or a tri(lower)alkylamine-sulfur trioxide, i.e., triethylamine-, trimethylamine-sulfur trioxide complex, etc., sulfur trioxide, or their functional equivalent, but preferably pyridine-sulfur trioxide or trimethylamine-sulfur trioxide, preferably in a ratio of 1.0 to 1.4 equivalents of the sulfur trioxide complex per equivalent of the penicillin acid, in the presence of a base, preferably an organic base such as a pyridine, N-methylpiperidine, tri(lower)alkylamine, or the like, but preferably in the presence of pyridine or triethylamine, preferably in a ratio of one to two moles of amine per mole of the penicillin acid, in an inert solvent such as dimethylformamide, dimethylsulfoxide, chloroform, tetrahydrofuran, methylene chloride, but preferably methylene chloride, at a temperature in the range of about −20° C. to 50° C., but preferably about 0° C. to 20° C., for a period of time of about five minutes to about two hours, but preferably about five to thirty minutes, with rapid agitation to produce a compound having the formula

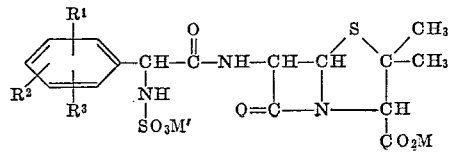

or

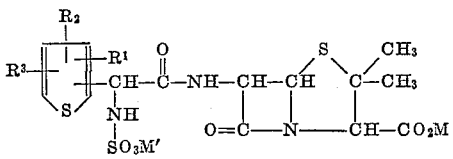

wherein $R^1$, $R^2$ and $R^3$ are as defined above, M and M' are alike or different and each is hydrogen or a cation corresponding to the base used above, and/or the base of the $SO_3$ complex, and (b) Treating the above compound with a pharmaceutically acceptable base, in a ratio of about one to three moles of base per mole of compound, the base being characterized as a "readily available" source of pharmaceutically acceptable nontoxic cations, or as being capable of forming pharmaceutically acceptable ammonium or substituted ammonium cations to produce compounds having the formulas

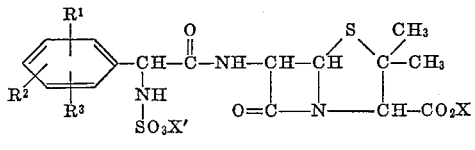

or

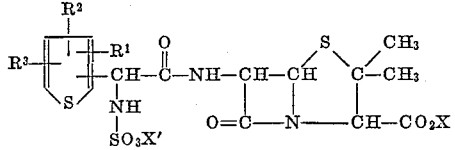

wherein $R^1$, $R^2$ and $R^3$ are as defined above, X and X' are alike or different and each is hydrogen or a pharmaceutically acceptable nontoxic cation, but preferably X and X' are alike or when X is hydrogen, X' is a pharmaceutically acceptable cation.

"Readily available" source of pharmaceutically acceptable nontoxic cation such as sodium, potassium, calcium, aluminum, or the like, is defined for the purpose of the present invention to mean: a hydroxide, i.e., sodium hydroxide, calcium hydroxide, ammonium hydroxide, or the like; a weak acid salt of a strong base, i.e., sodium or potassium 2-ethylhexanoate, or the like; a pharmaceutically acceptable non-toxic amine capable of forming a substituted ammonium cation, i.e., a tri(lower)alkylamine, procaine, dibenzylamine, N-benzyl-beta-phenethylamine, 1-ephenamine, N,N'-dibenzylethylenediamine, dehydroabietylamine, N,N'-bis-dehydroabietylethylenediamine, N-(lower)alkylpiperidine, or other such amines which have been used to form pharmaceutically acceptable nontoxic salts with benzylpenicillins.

The compounds of the present invention are characterized by two acidic functional groups; the sulfamic acid and carboxylic acid moieties. The free diacids of Compounds IA and IB (X and X' are hydrogen) are unstable and decompose quite rapidly.

The sulfamic acid moiety is characteristic of a strong acid while the carboxylic acid moiety is substantially less acidic. Because of the difference in the relative degree of acidity of these two acid functions, it is possible to prepare either a monosalt (sulfamate) or a disalt (sulfamate-carboxylate) of the parent compounds.

The mono and disalts of the present invention can be prepared by stoichiometric titration under anhydrous conditions in an anhydrous solvent by the use of one or two moles respectively of an anhydrous base such as sodium or potassium 2-ethylhexanoate in 1-butanol, or the like, or an organic base, such as a trialkylamine, dibenzylamine, and the others heretofore mentioned. The salts can also be formed in an aqueous solution.

The mono salts (sulfamates) are stable salts and remain as such in aqueous media at a pH as low as 1.

The disalts (sulfamate-carboxylate) are stable and remain as such in aqueous media at a pH as low as about 4.5. Dropping the pH of a solution of a disalt to about pH 1 produces the monosalt.

In the treatment of bacterial infections in man, the compounds of this invention are administered topically, orally and parenterally, but preferably parenterally, in accordance with conventional procedures for antibiotic administration in an amount of from about 5 to 125 mg./kg./day and preferably in the range of 35 to 85 mg./kg./day for Pseudomonas infections in divided dosages, e.g., three or four times a day. They are administered in dosage units containing, for example, 250, 500, 1000 and 2000 mg. of active ingredient with suitable physiologically acceptable carriers or excipients. The dosage units can be in the form of liquid preparations such as solutions, dispersions, emulsions or in solid form such as tablets, capsules, etc.

The following examples will serve to illustrate this invention without limiting it thereto.

DESCRIPTION OF THE PREFERRED EMBODIMENTS

Example 1.—6 - (D-α-sulfoaminophenylacetamido)-penicillanic acid disodium salt (III)

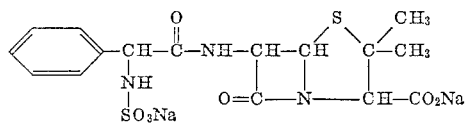

A suspension of 2.02 g. (5 mmoles) of D-α-aminobenzyl-penicillin trihydrate in 50 ml. of methylene chloride containing 0.84 g. (6 mmoles) of triethylamine was stirred until most of the solid dissolved. Approximately 2 g. of pulverized Linde 4A molecular sieves were than added, and stirring was continued for one hour. The molecular sieves were removed by filtration and, to the stirred, ice-cooled filtrate was added 0.84 g. (6 mmoles) of trimethylamine-sulfur trioxide in small portions over five minutes. Stirring was continued for five minutes with cooling, then for two hours without cooling. The clear, almost colorless reaction mixture was added to a solution of 2.5 g. (15 mmoles) of sodium 2-ethylhexanoate in 10 ml. of 1-butanol, and the resulting solid was removed by filtration. This solid was dissolved in 20 ml. of water, the pH was adjusted to 5.0 with acetic acid, and the cloudy solution was stirred at pH 4.9–5.1 for one hour with ice cooling. The resulting cloudy solution was filtered through diatomaceous earth into 700 ml. of stirred, ice-cooled acetone. The resulting precipitate was isolated by centrifugation, washed with acetone, and dried to give 2.0 g. of 6-(D-α-sulfoaminophenylacetamido)-penicillanic acid disodium salt, M.P. 219–230° (decomposition).

Analysis.—Calc'd. for $C_{16}H_{17}N_3O_7S_2Na_2 \cdot 3H_2O$: C, 36.43, H, 4.39. Found: C, 36.02, 36.07; H, 4.60, 4.82.

The 6 - (D-α-sulfoaminophenylacetamido)-penicillanic acid disodium salt (III) was compared to ampicillin in its activity against 12 strains of Pseudomonas aeruginosa:

| Pseudomonas aeruginosa Strain | MIC (μg./ml.) | |
|---|---|---|
| | III | Ampicillin |
| 1 | 32 | 160 |
| 2 | 63 | 312 |
| 3 | 63 | 312 |
| 4 | 32 | 80 |
| 5 | 32 | 160 |
| 6 | 63 | 160 |
| 7 | 32 | 160 |
| 8 | 32 | 312 |
| 9 | 32 | 312 |
| 10 | 250 | 625 |
| 11 | 63 | 312 |
| 12 | 22 | 160 |

The above table shows the MIC's (Minimum Inhibitory Concentrations) of ampicillin range from about 3 to 10 times that of compound III.

Example 2.—6-[D-α-sulfoamino-α-(3-thienyl)acetamido]-penicillanic acid disodium salt (IV)

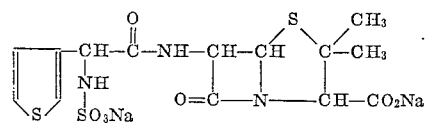

A suspension of 10 mmoles of 6-[D-α-amino-α(3-thienyl) - acetamido] - penicillanic acid in 100 ml. of methylene chloride containing 12 mmoles of triethylamine was stirred until most of the solid dissolved. To the stirred and preferably cooled solution was added 12 mmoles of trimethylamine-sulfur trioxide in small portions over a five minute period. After about 30 minutes the clear, almost colorless, reaction mixture was filtered and then concentrated in vacuo to about one-tenth its original volume. The resultant concentrated solution was diluted with about a one fold volume of acetone to which was added a butanol-sodium 2-ethylhexanoate (SEH) solution containing about 30 mmoles of SEH. A solid formed upon stirring and cooling the flask and was collected by filtration. This precipitate was dissolved in about 40 ml. of water, filtered and diluted with about 20 volumes of 2-propanol to produce good quality 6-[D-α-sulfoamino-α-(3-thienyl) - acetamido] - penicillanic acid disodium salt, M.P. 238–240° C. (decomposition).

Analysis.—Calc'd. for $C_{14}H_{15}N_3O_7S_3Na_2C_3H_8O$: C, 37.84; H, 4.30; N, 7.79. Found: C, 37.26; H, 4.17; N, 7.35.

M.I.C.'s against six strains of Pseudomonas aeruginosa: (1) 63 μg./ml., (2) 32 μg./ml., (3) 63 μg./ml., (4) 125 μg./ml., (5) 250 μg./ml. and (6) 63 μg./ml.

Example 3.—6-[L-α-sulfoaminophenylacetamido]-penicillanic acid dipotassium salt

A suspension of 5 mmols of 6-[L-α-aminophenylacetamide]-penicillanic acid. M.P. 205° C. (decomposition), in 50 ml. of dimethylformamide containing 12 mmoles of pyridine is stirred until solution is nearly complete. Some molecular sieves may be added. Pyridine-sulfur trioxide (6 mmoles) is added in small portions over a five minute period at about 20 to 30° C. with vigorous stirring. Stirring is continued for about one hour, following which the solution-mixture is filtered. About 15 mmoles of potassium 2-ethylhexanoate in acetone is added to the resultant solution which then may form a gel. The gel is extracted into one or two small portions of water, which are combined and added to a large volume of acetone or 2-propanol to precipitate the product which is 6-[L-α-sulfoaminophenylacetamido]-penicillanic acid dipotassium salt.

Example 4.—6-[D-α-sulfoamino-α-(2-thienyl)-acetamido]-penicillanic acid disodium salt A suspension of 5 mmoles of 6 - [D - α - amino - α-(2-thienyl)-acetamido]-penicillanic acid in 50 ml. of methylene chloride containing 12 mmoles of pyridine is stirred until solution is nearly complete. Some molecular sieves may be added. Triethylamine-sulfur trioxide (6 mmoles) is added in small portions over a five minute period at about 20–30° C. with vigorous stirring. Stirring is continued for about one hour, following which the solution-mixture is filtered. About 15 mmoles of sodium 2-ethylhexanoate in acetone is added to the resultant solution which then may form a gel. The gel is extracted into one or two small portions of water, which are combined and added to a large volume of acetone or 2-propanol to precipitate the product which is 6-[D-α-sulfoamino-α-(2-thienyl)-acetamido]-penicillanic acid.

Example 5

When in the procedure of Example 1 the D-α-aminobenzylpenicillin used therein is replaced with 5 mmoles of:

α-amino-p-sulfamylbenzylpenicillin,
α-amino-p-chlorobenzylpenicillin,
α-amino-p-methoxybenzylpenicillin,
α-amino-p-diethylaminobenzylpenicillin,
α-amino-p-trifluoromethylbenzylpenicillin,
α-amino-2,4-dibromobenzylpenicillin,
α-amino-o-nitrobenzylpenicillin,
α-amino-m-methylbenzylpenicillin,
α-amino-m-iodobenzylpenicillin,
α-amino-o-acetamidobenzylpenicillin,
6-[α-amino-α-(3-methyl-2-thienyl)-acetamido]-penicillanic acid,
α-amino-2,6-dichlorobenzylpenicillin,
α-amino-o-chlorobenzylpenicillin, or
α-amino-2-chloro-6-fluorobenzylpenicillin respectively.

The following corresponding penicillins are produced:

disodium α-sulfoamino-p-sulfamylbenzylpenicillanate,
disoduim α-sulfoamino-p-chlorobenzylpenicillanate,
disodium α-sulfoamino-p-methoxybenzylpenicillanate,
disodium α-sulfoamino-p-diethylaminobenzylpenicillanate,
disodium α-sulfoamino-p-trifluoromethylbenzylpenicillanate,
disodium α-sulfoamino-2,4-dibromobenzylpenicillanate,
disodium α-sulfoamino-o-nitrobenzylpenicillanate,
disodium α-sulfoamino-m-methylbenzylpenicillanate,
disodium α-sulfoamino-o-iodobenzylpenicillanate,
disodium α-sulfoamino-o-acetamidobenzylpenicillanate,
6-[α-sulfoamino-α-(3-methyl-2-thienyl)-acetamido]-penicillanic acid disodium salt,
disodium α-sulfoamino-2,6-dichlorobenzylpenicillanate,
disodium α-sulfoamino-o-chlorobenzylpenicillanate, or
disodium α-sulfoamino-2-chloro-6-fluorobenzylpenicillanate.

The pulverized Linde 4A molecular sieves employed in Example 1 are added to make the system as anhydrous as possible. Care should be taken to remove them from the system prior to the addition of the sulfur trioxide complex. Although the products of the various examples are produced in the absence of the use of the molecular sieves, better yields appear to be obtained when they are used.

The α-aminopenicillanic acids used as starting materials in the present invention can be made by various methods known to the art, the most preferred of which is embodied in U.S. Patent No. 3,140,282 which employs the condensation of an acid chloride hydrochloride with 6-aminopenicillanic acid to produce an α-aminopenicillanic acid as illustrated below:

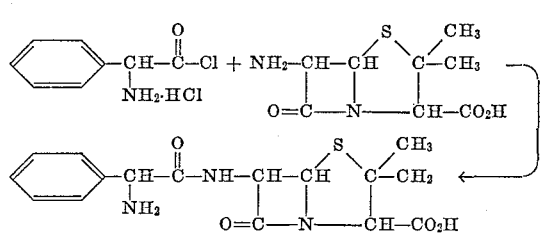

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

I claim:
1. The compounds having the formula

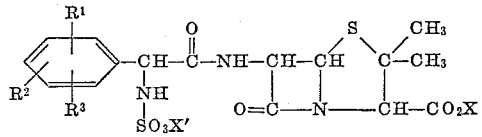

or

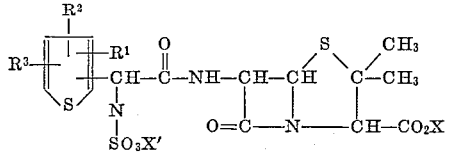

wherein $R^1$, $R^2$ and $R^3$ each represents a member selected from the group consisting of hydrogen, nitro, di(lower)alkylamino, (lower)alkanoylamino, (lower)alkanoyloxy, (lower)alkyl, (lower)alkoxy, sulfamyl, chloro, iodo, bromo, fluoro and trifluoromethyl, X and X' are alike or different and each represents hydrogen or a pharmaceutically acceptable nontoxic cation.

2. A compound of claim 1 having the formula

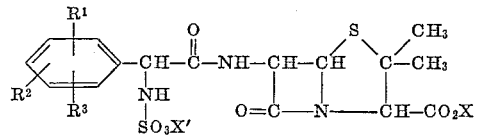

wherein $R^1$, $R^2$ and $R^3$ each represents a member selected from the group consisting of hydrogen, nitro, di(lower)alkylamino, (lower)alkanoylamino, (lower)alkanoyloxy, (lower)alkyl, (lower)alkoxy, sulfamyl, chloro, iodo, bromo, fluoro and trifluoromethyl, X and X' are alike and each represents a pharmaceutically acceptable nontoxic cation.

3. A compound of claim 1 having the formula

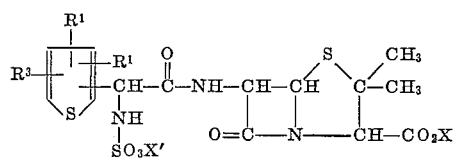

$R^1$, $R^2$ and $R^3$ each represents a member selected from the group consisting of hydrogen, nitro, di(lower)alkylamino, (lower)alkanoylamino, (lower)alkanoyloxy, (lower)alkyl, (lower)alkoxy, sulfamyl, chloro, iodo, bromo, fluoro and trifluoromethyl, X and X' are alike and each represents a pharmaceutically acceptable nontoxic cation.

4. A compound of claim 1 having the formula

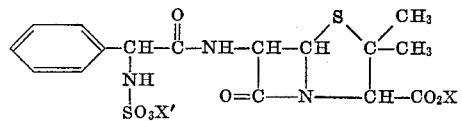

wherein X and X' are pharmaceutically acceptable nontoxic cations.

5. A compound of claim 1 having the formula

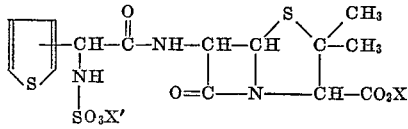

wherein X and X' are pharmaceutically acceptable nontoxic cations.

6. A compound of claim 1 known as 6-(D-α-sulfoaminophenylacetamido)-penicillanic acid disodium salt.

7. A compound of claim 1 known as 6-[D-α-sulfoamino-α-(3-thienyl)acetamido]-penicillanic acid disodium salt.

8. A compound of claim 1 known as 6-[D-α-sulfo-amino-α(2-thienyl)-acetamido]-penicillanic acid disodium salt.

9. The process comprising the consecutive steps of
(a) mixing a compound having the formula

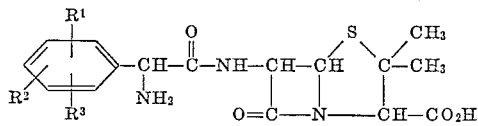

or

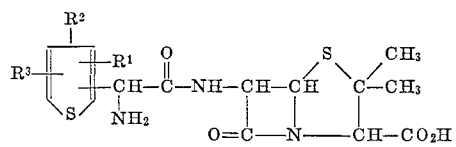

wherein $R^1$, $R^2$ and $R^3$ each represents a member selected from the group consisting of hydrogen, nitro, di(lower)alkylamino, (lower)alkanoylamino, (lower)alkanoyloxy, (lower)alkyl, (lower)alkoxy, sulfamyl, chloro, iodo, bromo, fluoro and trifluoromethyl; with a sulfur trioxide complex or sulfur trioxide in the presence of a base in an inert solvent to produce a compound having the formula

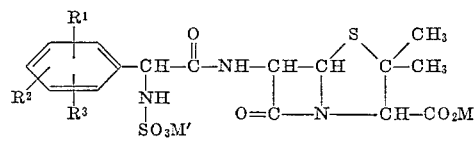

or

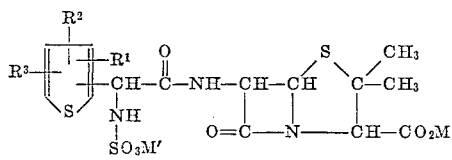

wherein $R^1$, $R^2$ and $R^3$ are as defined above and M and M' are alike or different and each is hydrogen or a cation; and (b) treating the above compounds with a pharmaceutically acceptable nontoxic base to produce compounds having the formulas

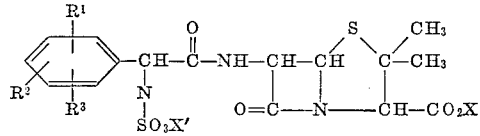

or

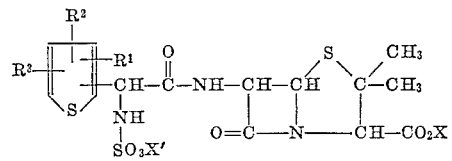

wherein $R^1$, $R^2$ and $R^3$ are as defined above,
X and X' are alike or different and each is hydrogen or a pharmaceutically acceptable nontoxic cation.

10. A process of claim 9 comprising the consecutive steps of
(a) mixing a compound having the formula

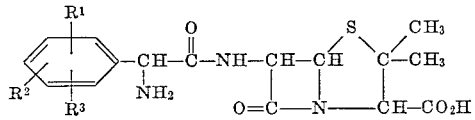

or

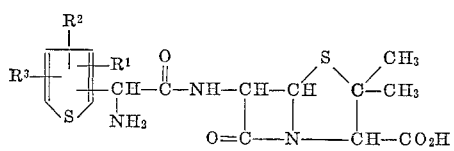

wherein $R^1$, $R^2$ and $R^3$ each represents a member selected from the group consisting of hydrogen, nitro, di(lower)alkylamino, (lower)alkanoylamino, (lower)alkanoyloxy, (lower)alkyl, (lower)alkoxy, sulfamyl, chloro, iodo, bromo, fluoro and trifluoromethyl; with a sulfur trioxide complex selected from the group comprising pyridine-sulfur trioxide, dioxane-sulfur trioxide, dimethylaniline-sulfur trioxide, thioxane-sulfur trioxide, bis-2-chloroethyl ether-sulfur trioxide, 2-methylpyridine-sulfur trioxide, dimethylformamide-sulfur trioxide, quinoline-sulfur trioxide, a tri(lower)alkylamine-sulfur trioxide, or their functional equivalents, in the presence of an organic tertiary amine in an inert solvent at a temperature in the range of about −20° C. to +50° C., for a period of time of about five minutes to about two hours with rapid agitation to produce a compound having the formula

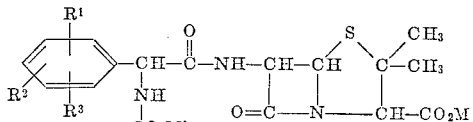

or

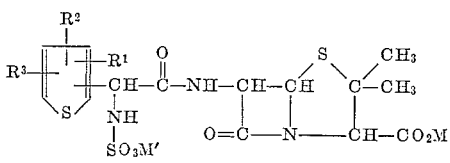

wherein $R^1$, $R^2$ and $R^3$ are as defined above, M and M' are alike or different and each is hydrogen or a substituted ammonium cation; and (b) treating the above compounds with a pharmaceutically acceptable nontoxic base, in a ratio of about one to three moles of base per mole of compound to produce compounds having the formula

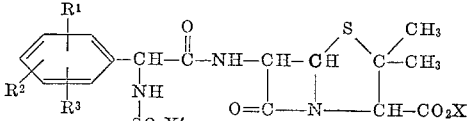

or

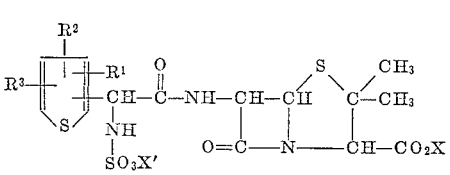

wherein $R^1$, $R^2$ and $R^3$ are as defined above,
X and X' are alike or different and each is hydrogen or a pharmaceutically acceptable nontoxic cation.

11. A process of claim 9 comprising the consecutive steps of
(a) mixing a compound having the formula

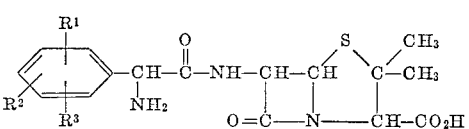

or

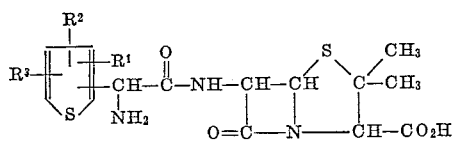

wherein $R^1$, $R^2$ and $R^3$ each represents a member selected from the group consisting of hydrogen, nitro, di(lower) alkylamino, (lower)alkanoylamino, (lower)alkanoyloxy, (lower)alkyl, (lower)alkoxy, sulfamyl, chloro, iodo, bromo, fluoro and trifluoromethyl;

with about 1.0 to 1.4 equivalent weights of a sulfur trioxide complex selected from the group comprising pyridine-sulfur trioxide, dioxane-sulfur trioxide, dimethylaniline-sulfur trioxide, thioxane-sulfur trioxide, bis-2-chloroethyl ether-sulfur trioxide, 2-methylpyridine-sulfur trioxide, dimethylformamide-sulfur trioxide, quinoline-sulfur trioxide, a tri(lower)alkylamine-sulfur trioxide, in the presence of an organic tertiary amine in an inert solvent selected from the group consisting of dimethylformamide, dimethylsulfoxide, chloroform, tetrahydrofuran and methylene chloride at a temperature in the range of about −10° C. to 30° C. for a period of time of about five minutes to one hour with rapid agitation to produce a compound having the formula

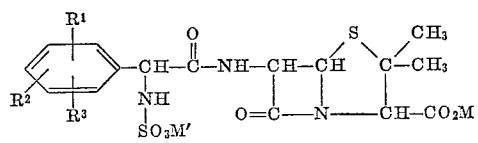

or

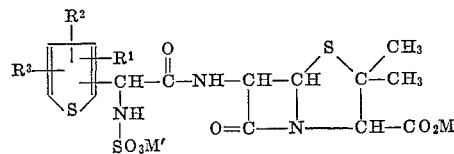

wherein $R^1$, $R^2$ and $R^3$ are as defined above, M and M' are alike or different and each is hydrogen or a substituted ammonium cation; and (b) treating the above compound with a pharmaceutically acceptable base, in a ratio of about one to three moles of base per mole of compound to produce compounds having the formula

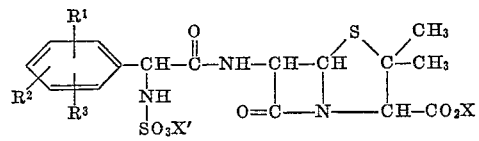

or

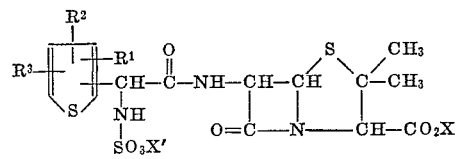

wherein $R^1$, $R^2$ and $R^3$ are as defined above, X' is a pharmaceutically acceptable nontoxic cation and X is hydrogen or a pharmaceutically acceptable nontoxic cation.

12. A process of claim 9 comprising the consecutive steps of (a) mixing a compound having the formula

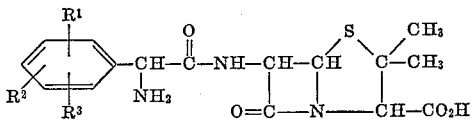

or

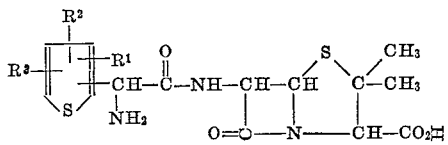

wherein $R^1$, $R^2$ and $R^3$ each represents a member selected from the group consisting of hydrogen, nitro, di(lower) alkylamino, (lower)alkanoylamino, (lower) alkanoyloxy, (lower)alkyl, (lower)alkoxy, sulfamyl, chloro, iodo, bromo, fluoro and trifluoromethyl;

with about one equivalent weight of pyridine-sulfur trioxide or trimethylamine-sulfur trioxide in the presence of a tri(lower)alkylamine or a pyridine, in a ratio of one to two moles of amine to one mole of the penicillin acid in methylene chloride at about 0° C. for a period of five to thirty minutes with rapid agitation to produce compounds having the formula

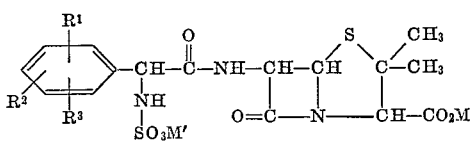

or

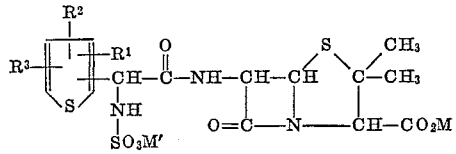

wherein $R^1$, $R^2$ and $R^3$ are as defined above, M and M' are alike or different and each is hydrogen, pyridinium or triethylammonium cation; and (b) treating the above compounds with sodium or potassium 2-ethylhexanoate dissolved in acetone or a butanol in a ratio of about one to three moles of the sodium or potassium 2-ethylhexanoate per mole of compound to produce compounds having the formula

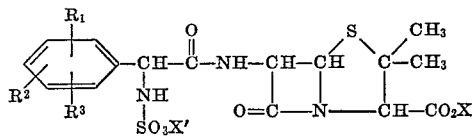

or

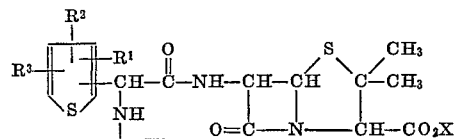

wherein $R^1$, $R^2$ and $R^3$ are as defined above, X and X' are alike and are sodium or potassium; or when X is hydrogen, X' is sodium or potassium.

No references cited.

NICHOLAS S. RIZZO, *Primary Examiner.*